United States Patent
Meyer

[11] Patent Number: 6,139,062
[45] Date of Patent: Oct. 31, 2000

[54] MUD FLAP LIFTER

[76] Inventor: Darin Meyer, 4137 Stony La., Doylestown, Pa. 18901

[21] Appl. No.: 09/134,965

[22] Filed: Aug. 18, 1998

[51] Int. Cl.⁷ .................................. B62B 9/14; B60P 1/00
[52] U.S. Cl. ........................ 280/851; 280/847; 298/1 SG
[58] Field of Search .................................. 280/851, 847, 280/848, 154; 298/1 SG

[56] References Cited

U.S. PATENT DOCUMENTS

| | | |
|---|---|---|
| 2,721,760 | 10/1955 | Lapham et al. . |
| 2,857,200 | 10/1958 | Hoppesch . |
| 3,195,920 | 7/1965 | Knisely et al. . |
| 3,310,344 | 3/1967 | Beintum et al. . |
| 3,507,513 | 4/1970 | Bohrer . |
| 3,582,109 | 6/1971 | Moore . |
| 3,640,577 | 2/1972 | Ducote . |
| 3,794,383 | 2/1974 | France et al. ............................ 280/851 |
| 3,799,580 | 3/1974 | McGuire ................................. 280/851 |
| 3,802,739 | 4/1974 | Knyszel et al. ........................ 280/851 |
| 3,806,196 | 4/1974 | Cole et al. .............................. 280/851 |
| 3,806,197 | 4/1974 | Knyszek et al. . |
| 4,097,090 | 6/1978 | Payne et al. . |
| 4,124,221 | 11/1978 | Goings . |
| 4,221,432 | 9/1980 | VanRemortel et al. . |
| 4,362,310 | 12/1982 | Goodall ................................... 280/851 |
| 4,627,594 | 12/1986 | Reed . |
| 4,726,599 | 2/1988 | Antekeier et al. . |
| 5,205,590 | 4/1993 | Drabing et al. . |
| 5,582,431 | 12/1996 | Anderson . |

*Primary Examiner*—Lanna Mai
*Assistant Examiner*—Jeff Restifo
*Attorney, Agent, or Firm*—Gregory J. Gore

[57] ABSTRACT

A mud flap lifting system for trucks pushes the mud flaps from their inside surface upward and rearward away from the rear tires. Push bars swing about a pivot from the underside of the truck body directly behind the mud flap. The push bars include C-shaped arms which receive the upper portion of the folded mud flap as it is retracted. Fully retracted, the mud flap is compactly folded so that it is less susceptible to damage. The lift mechanism is pneumatically powered by a single centrally-located cylinder which actuates twin linkages on either side of the truck through a transverse pivoting axle so that both mud flaps may be retracted simultaneously by a single pneumatic actuator.

11 Claims, 3 Drawing Sheets

MUD FLAP LIFTER

FIELD OF THE INVENTION

This invention relates to movable or retractable mud flaps for vehicles, particularly dump trucks. More specifically, it relates to actuators for moving mud flaps which are pneumatically powered.

BACKGROUND OF THE INVENTION AND DESCRIPTION OF PRIOR ART

Problems arise when mud flaps behind the rear wheels of trucks contact objects behind the truck as it is backing up. When this happens, the mud flaps are pinched against the rear wheels and are often torn away or otherwise damaged. Damaged mud flaps can disable a vehicle since federal law requires that all such trucks in interstate commerce include mud flaps in good condition and of sufficient length. Trucks traveling over the highway with damaged mud flaps are illegal and may be subject to fines and other penalties.

There have been suggested many different devices for moving or retracting dump truck mud flaps in order to cure the above-stated problem of damage caused to the mud flaps while backing up the truck. These devices are described, for example, in U.S. Pat. Nos. 2,653,846 to Wiley; 3,582,109 to Moore; 2,872,211 to Barrett; 3,640,577 to Ducote; 2,857,200 to Hoppesch; 2,721,760 to Lapham; 3,788,668 to Perger; 3,794,383 to France; 4,097,090 to Payne; and 5,582,431 to Anderson. These patents disclose various systems for moving the mud flaps away from the rear wheels, some of which are pneumatically operated. The various devices employ methods for either retracting each mud flap upward into an enclosure, moving it sideways, or pulling it up from above by a cable. The systems which retract mud flaps into an enclosure are very expensive and the mud flap can become jammed inside the enclosure by mud and other debris. The most economical of prior art mud flap protection systems are those employing cable operation, such as the system disclosed in U.S. Pat. No. 3,582,109 issued to Moore.

In the Moore system, a cable attached to the outside of each mud flap is pulled from above, folding the mud flap as it is lifted upward and rearward away from the truck tires. While this does not provide full retraction of the mud flap from behind the tires, the movement of the mud flap is sufficient to prevent damage without requiring a complex retraction system. However, the problem with cable-actuated systems such as disclosed by Moore is that the cables, because they are necessarily exposed and are located above and rearward of the mud flaps, can themselves become damaged by weather or contact with obstacles and loads at the rear of the truck. Furthermore, the attachment of the cables is often made directly to the mud flaps. This can cause cracking and damage to the mud flaps because the mud flap is weakened at the point of attachment since it is not designed to experience a pulling force at that point. Finally, cable systems such as the Moore system require that the mud flap be altered to receive the cable attachment, thereby increasing the cost of installation and making replacement of mud flaps more difficult and more costly. There is therefore a need in the art for an economical mud flap retraction system which prevents damage to mud flaps during normal operation of trucks, such as dump trucks, yet is economical and easy to use.

SUMMARY OF THE INVENTION

In order to meet the needs in the art for an improved mud flap retraction system as explained above, the present mud flap lifter has been devised. The present device departs from the prior art in that it pushes the mud flap from the inside, rather than pulling it from the outside. This permits the mud flap lifting mechanism to be protected by partial enclosure underneath existing truck structures. It does not project rearward of the normal mud flap position when not in use and therefore it is much less susceptible to damage than the prior art devices. The present invention employs simple push bars which swing about a pivot from the underside of the truck body behind the mud flap to lift the flap upward and rearward so that it is held a safe distance from the rear tires. This distance prevents the mud flap from being pinched between obstacles and the rear tires so that damage to the mud flaps will not occur. Because simple push bars are used, there is no requirement that the mud flaps be altered since there is no direct attachment between the lift mechanism and the mud flap. Because of the way in which the present push bars work, lifting forces are distributed over a greater area of the mud flap compared to other systems, such as those requiring direct cable attachment. Also because there is no direct attachment between the lift mechanism and the mud flap, mud flaps can be replaced or interchanged without any impediment caused by the mud flap lifting system.

More specifically, the applicant has invented a mud flap lifter for a truck, comprising a body of the truck; a mud flap affixed to the body at a fixed attachment point; a push bar pivotally affixed to the body by a pivot joint, the push bar located between the rear tire of the truck and the mudflap, the bar being held by a first arm extending from the pivot joint; and means for moving the push bar about the pivot joint, the push bar contacting the inside surface of the mud flap such that said push bar lifts the mud flap and moves it rearward away from the rear tire. The push bar is moved by a pneumatic cylinder which is connected through a connecting rod and crank arm that rotates a transverse axle which transmits the rotational movement of the crank arm to right and left side push bars. Each push bar is connected to opposite ends of the transverse axle by a linkage at each side of the truck body. Each push bar is cylindrical and extends substantially across the entire width of each mud flap. As the pneumatic cylinder is actuated, the push bars move into contact with the back side of the mud flaps and lift them upward and away from the rear tires.

It is therefore the main object of the invention to provide a mud flap protection device which is economical to manufacture and easy to use. It is a further object of the present invention to provide a mud flap retraction system which itself is not prone to damage and requires little maintenance. It is a further object of the present invention to provide a mud flap retraction system which is easy to install and which does not require any modification to the existing mud flaps. It is yet another object of the present invention to provide a mud flap retraction system which does not increase the wear and maintenance of mud flaps, nor increase the expense of replacing mud flaps. Other objects, advantages and novel features of the invention will become apparent from the following detailed description of the invention when considered in conjunction with the accompanying drawings.

BRIEF DESCRIPTION OF THE PREFERRED EMBODIMENT

Figure 1:
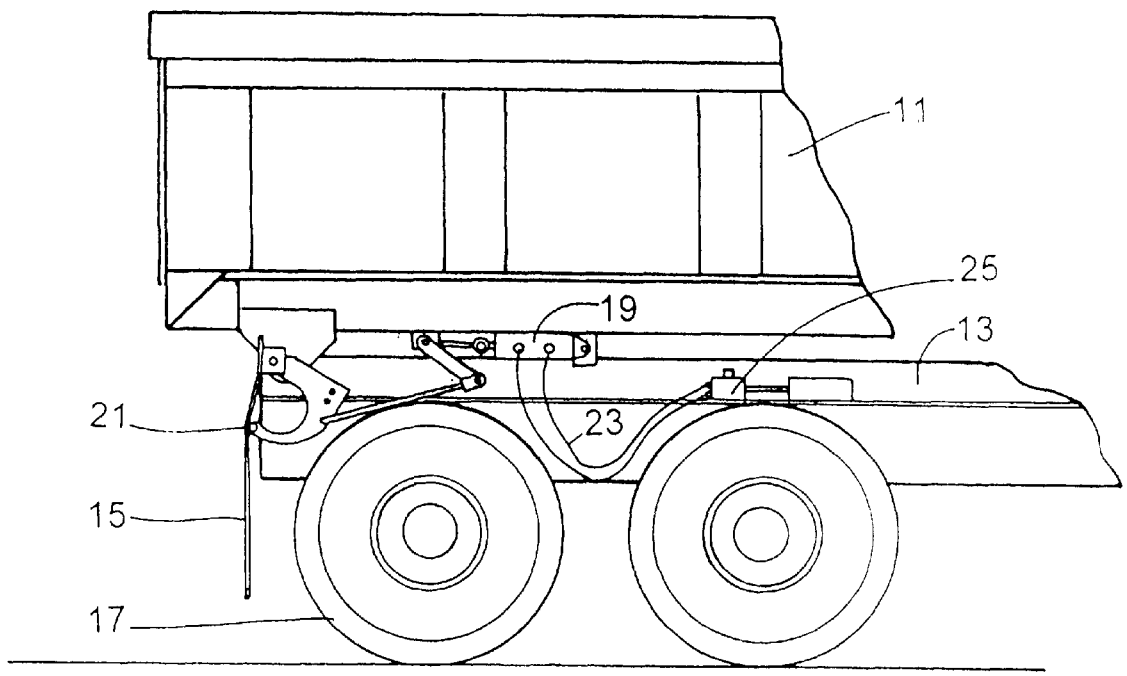
FIG. 1 is a right side partial view of the rear of a truck showing the present invention in the "at rest" position.

Referring now to FIG. 1, the present invention is shown installed at the rear of a typical dump truck. The truck includes body 11 which is tiltably affixed to frame 13. Mud flap 15 is shown in its "at rest" position for over-the-road travel, the mud flap being held at a fixed attachment point and extending the proper distance downward and behind rear tire 17. Pneumatic cylinder 19 moves a linkage which will be described in greater detail with regard to FIG. 4 that presses a push bar 21 in the form of a cylindrical rod into the inside surface of mud flap 15. The pneumatic cylinder is fed by air lines 23 that are controlled by electromechanical valve 25. The action of the push bar lifts and moves the mud flap rearward.

Figure 2:
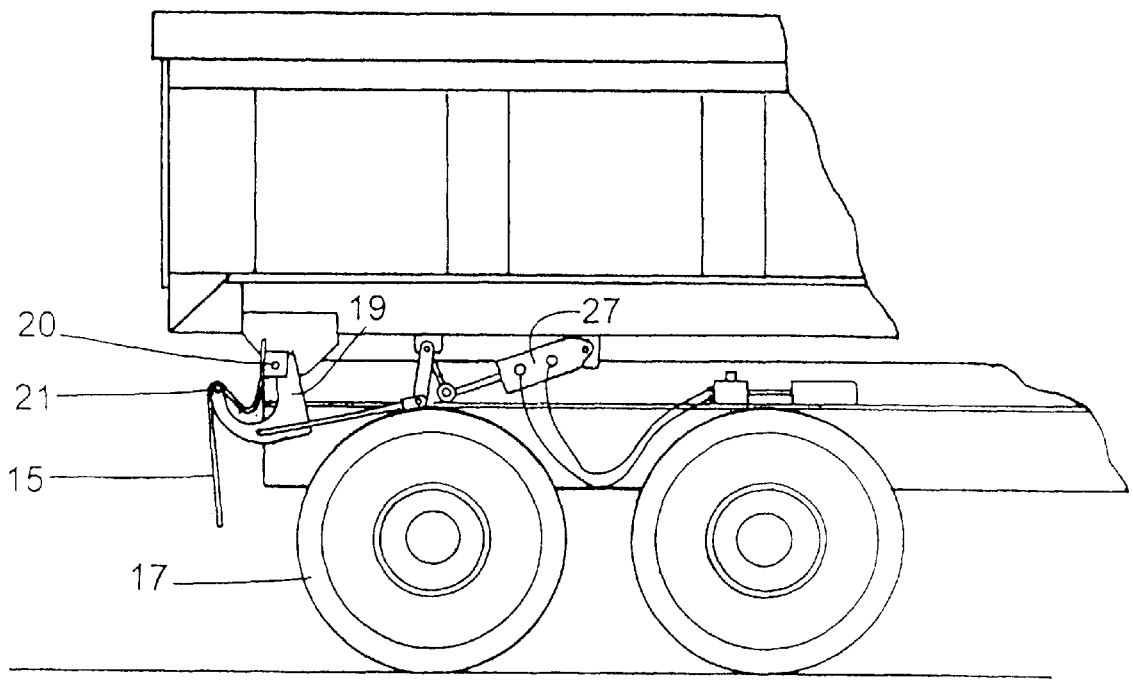
FIG. 2 is a right side partial view of the rear of a truck shown with the present invention actuated and the mud flaps lifted.

Referring now to FIG. 2, the present invention is shown with the mud flaps in their retracted position. In this position, the pneumatic cylinder 19 has retracted, moving the push bar 21 against the back of mud flap 15, lifting it and moving it rearward away from rear tire 17. The push bar is held by a C-shaped arm 27 that is moved by the pneumatic cylinder 19 through a lever arm linkage described with particularity in FIG. 4. The arm 27 rotates about pivot joint 20 and is shaped to receive the fold of the mud flap 15 within the arc of its curved shape. Thus, as shown in this figure, the action of the push bar creates a double fold in the mud flap which compactly displaces the mud flap up and away from the tire.

Figure 3:
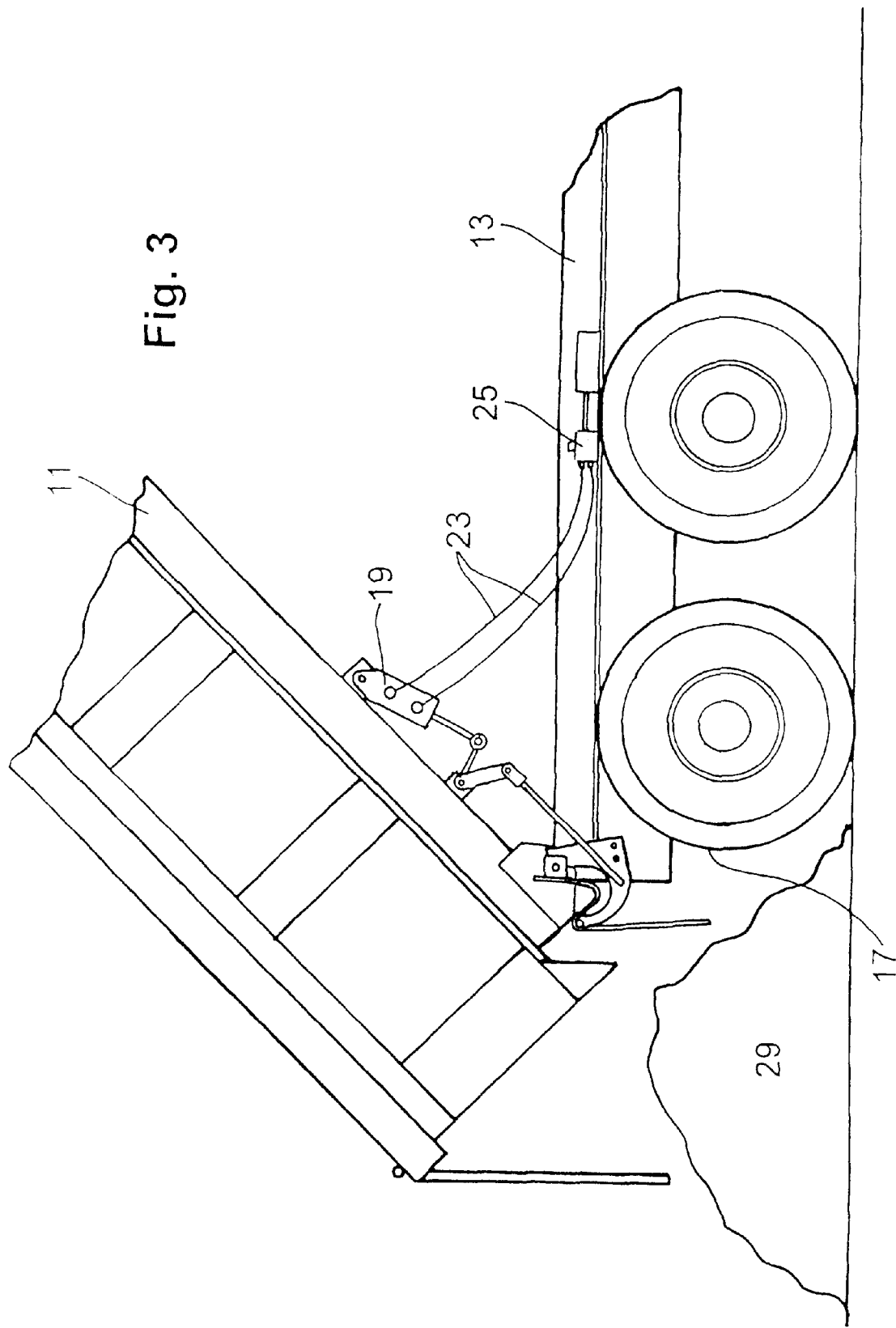
FIG. 3 is a right side partial view showing the mud flaps lifted while the truck body is tilted with regard to the frame.

FIG. 3 shows the present invention holding the mud flaps in their lifted position as shown in FIG. 2, but with the truck body 11 tilted with regard to frame 13 as would be the case when a load depicted in this figure as 29 is dumped from the truck body. Flexible air lines 23 which feed the pneumatic actuating cylinder 19 are of sufficient length to extend between the control valve 25 and the pneumatic cylinder, regardless of the tilt position of the body. It will be readily appreciated that the position of the mud flaps are not affected as the truck body is tilted, since the actuating cylinder and interconnecting linkage which moves the mud flap push bars is mounted directly to the truck body 11. With the mud flaps held in their lifted position as shown in this figure, the mud flaps are positioned away from the load and away from the rear tires so that if the truck operator were to reverse the truck rear tire 17 against the load, the mud flap would not become trapped and possibly damaged. It will also be appreciated that in situations where loads are not dumped, the retracted mud flaps are held to a height above curbing or other obstacles that the truck might be backed up against which would pinch the mud flap against the rear tire.

Figure 4:
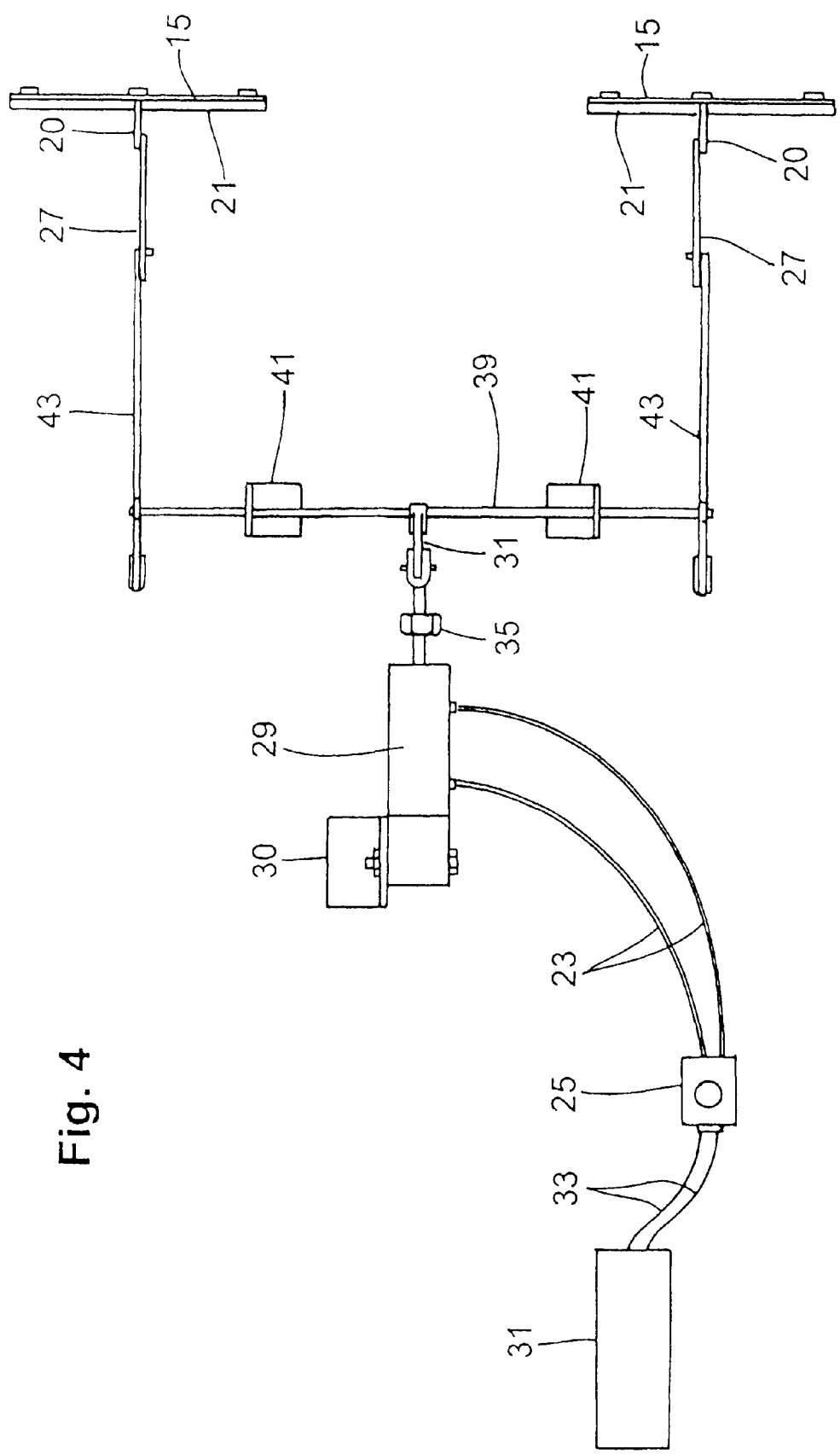
FIG. 4 is a plan view of the major components of the present invention shown in isolation.

Referring now to FIG. 4, a top view of the major components of the present invention as they are installed on a truck are shown. Pneumatic cylinder 29 is centrally located in the middle of the truck body and moves symmetrical right and left side linkages in unison so that mud flaps 15 are lifted and lowered simultaneously. Pneumatic cylinder 29 is fed by air lines 23 which are regulated by electromechanical valve 25. Controller 31 electrically signals valve 25 through wiring 33. Pneumatic cylinder 29 is mounted to the truck body by way of bracket 30 and moves connecting rod 35 that in turn moves crank arm 37 which is rigidly affixed to transverse axle 39. Axle 39 is rotatably held to the truck body by way of brackets 41. Motion to the mud flap push bars 21 is transmitted at either side of the truck through identical linkages 43 which transfer rotation of the transverse axle 37 to the arms 27 that hold push bars 21. Arms 27 are rotatable about a pivot joint 20 provided by a simple pin and bracket assembly. By these mechanical relations, it will be readily understood by those in the mechanical arts that as connecting rod 35 is retracted by the pneumatic cylinder, that the right and left side linkages move the push bar arms 27 rearward to effect the desired lifting of the mud flaps 15 as previously described.

As described above, the various objects of the present invention have been achieved. The embodiment described in detail above provides an economical and simple mud flap lifter for a dump truck which is easy to install and which offers minimal interference with existing mud flaps. Mud flaps may be easily replaced without interference with the lift mechanism. The lifting device is extremely durable and adds little to shortening the life of mud flaps by increasing their wear.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A combination truck and mud flap lifter, comprising:
   a mud flap having means to rigidly affix to a body of said truck along a top edge of said mud flap;
   a push bar pivotally affixed to said body by a pivot joint, said push bar located between the rear tire of said truck and said mud flap, said push bar being held by a first arm extending from said pivot joint;
   means for moving said push bar about said pivot joint, said push bar contacting the inside surface of said mud flap such that said push bar lifts only the bottom portion of said mud flap forming a first fold therein and moves it rearward away from the rear tire; and
   a second fold in said mud flap formed when it is fully lifted thereby holding the mud flap up and to into the rear of said rear tire in a compact, double folded condition.

2. The mud flap lifter of claim 1, wherein said means for moving said push bar comprises a pneumatic cylinder affixed to said truck body.

3. The mud flap lifter of claim 2, wherein said means for moving said push bar further includes a connecting rod and a crank arm affixed between said pneumatic cylinder and said first arm whereby linear motion of said connecting rod causes said first arm to swing about said pivot joint.

4. The mud flap lifter of claim 3, further including a transverse axle which transmits rotational movement between said crank arm and said first arm which is connected to one end of said axle.

5. The mud flap lifter of claim 3, wherein said crank arm is located approximately in the center of said transverse axle.

6. The mud flap lifter of claim 1, wherein the length of said push bar extends across the entire width of said mud flap.

7. The mud flap lifter of claim 6, wherein said push bar is cylindrical.

8. The mud flap lifter of claim 1, wherein said body is tiltably affixed to a frame of said truck.

9. The mud flap lifter of claim 8, wherein said first arm is C-shaped.

10. A combination truck and mud flap lifter, comprising:
    a body of said truck;

a mud flap rigidly affixed to a body along a top edge of said mud flap;

a push bar pivotally affixed to said body by a pivot joint, said push bar located between the rear tire of said truck and said mud flap, said push bar being held by a first arm extending from said pivot joint;

means for moving said push bar about said pivot joint, said push bar contacting the inside surface of said mud flap such that said push bar lifts only the bottom portion of said mud flap and moves it rearward away from the rear tire;

a pneumatic cylinder affixed to said truck body for moving said push bar;

a connecting rod and a crank arm affixed between said pneumatic cylinder and said first are whereby linear motion of said connecting rod causes said first arm to swing about said pivot joint;

a transfer axle which transmits rotational movement between said crank arm and said first arm which is connected to one end of said axle; and a second push bar connected to an opposite end of said transverse axle, whereby actuation is said pneumatic cylinder simultaneously lifts right and left side mud flaps.

11. A combination truck and mud flap lifter, comprising:

a body of said truck;

a mud flap rigidly affixed to a body along a top edge of said mud flap;

a push bar pivotally affixed to said body by a pivot joint, said push bar located between the rear tire of said truck and said mud flap, said push bar being held by a first arm extending from said pivot joint;

means for moving said push bar about said pivot joint, said push bar contacting the inside surface of said mud flap such that said push bar lifts only the bottom portion of said mud flap and moves it rearward away from the rear tire;

a pneumatic cylinder affixed to said truck body for moving said push bar;

a connecting rod and a crank arm affixed between said pneumatic cylinder and said first are whereby linear motion of said connecting rod causes said first arm to swing about said pivot joint;

a transfer axle which transmits rotational movement between said crank arm and said first arm which is connected to one end of said axle;

a second push bar connected to an opposite end of said transverse axle, whereby actuation is said pneumatic cylinder simultaneously lifts right and left side mud flaps; and a pair of lever and rod linkages connecting said first and second arms to opposite ends of said transverse axle.

* * * * *